United States Patent [19]

Duhaut et al.

[11] 3,852,215

[45] Dec. 3, 1974

[54] CATALYST FOR HYDROCARBON CONVERSION

[75] Inventors: Pierre Duhaut, Vesinet; Jean Miquel, Paris, both of France

[73] Assignee: Societe Francaise des Products Pour Catalyse, Rueil-Malmaison, France

[22] Filed: Dec. 13, 1972

[21] Appl. No.: 314,588

[30] Foreign Application Priority Data
Dec. 13, 1971 France .............................. 71.44781

[52] U.S. Cl................. 252/441, 208/138, 208/139, 252/466 PT
[51] Int. Cl.......................... B01j 11/78, B01j 11/12
[58] Field of Search............. 252/441, 442, 466 PT; 208/138, 139

[56] References Cited
UNITED STATES PATENTS

| | | | |
|---|---|---|---|
| 2,500,146 | 3/1950 | Fleck et al. ......................... | 208/138 |
| 2,814,599 | 11/1957 | LeFrancois et al. ................ | 208/138 |
| 2,848,377 | 8/1958 | Webb................................... | 208/139 |
| 2,906,700 | 9/1959 | Stine et al. ..................... | 252/466 PT |
| 2,914,464 | 11/1959 | Burton et al. ....................... | 252/442 |
| 3,002,920 | 10/1961 | Porter ............................ | 252/466 PT |
| 3,632,620 | 1/1972 | Kober et al. ......................... | 252/441 |
| 3,654,184 | 4/1972 | McCallister et al. ............... | 208/138 |
| 3,670,044 | 6/1972 | Drehman et al. .................... | 208/138 |
| 3,694,348 | 9/1972 | Bursian et al. ...................... | 208/138 |
| 3,748,260 | 7/1973 | Hayes ................................. | 208/138 |

*Primary Examiner*—Delbert E. Gantz
*Assistant Examiner*—James W. Hellwege
*Attorney, Agent, or Firm*—Millen, Raptes & White

[57] ABSTRACT

Catalyst and process for converting, for example reforming, hydrocarbons. The catalyst contains an alumina carrier, platinum, iridium and at least one metal selected from the group consisting of scandium, yttrium, titanium, zirconium, hafnium, thorium and germanium.

10 Claims, No Drawings

CATALYST FOR HYDROCARBON CONVERSION

This invention concerns a new catalyst containing (a) alumina, (b) platinum (c) iridium and (d) at least one metal selected from the group consisting of scandium, yttrium, titanium, zirconium, hafnium, thorium and germanium.

The invention also concerns the use of this catalyst in hydrocarbon conversion reactions, for example a reforming reaction.

Catalysts containing platinum deposited on alumina have been known for years, but, in spite of the many improvements brought to these catalysts, for example by incorporating additives such as tungsten, molybdenum, iridium, rhodium and the like, attempts are always made to discover new platinum containing catalysts which would give better yields than those obtained up to now and would have a longer life than the known catalysts. Attempts are also made to improve the mechanical strength of these catalysts, since they are usually employed in fixed bed or moving bed, in the form of agglomerates, for example balls or extrudates of significant size, so as to allow the gaseous reactants to pass easily therethrough. The attrition of these catalysts results in the formation of much smaller grains which progressively reduce the free space between the grains and requires the inlet reactant pressure to be increased or even the operation to be stopped.

It has now been found that particularly high yields may be obtained, for example in reforming reactions, when using a catalyst containing alumina and both platinum and one metal selected from scandium, yttrium, titanium, zirconium, hafnium, thorium and germanium. Above all it has been found that the life time of such a catalyst is increased when it contains iridium as a third metal element. The yields are thus stable over long periods.

The catalysts of the invention thus contains (a) an alumina carrier, (b) platinum, (c) iridium, (d) at least one metal selected from scandium, yttrium, titanium, zirconium, hafnium, thorium and germanium and, when required, (e) a halogen, for example chlorine or fluorine.

The catalyst of the invention preferably contains from 0.005 to 1%, particularly from 0.05 to 0.8% of platinum, from 0.005 to 1%, particularly from 0.01 to 0.09% of iridium and from 0.005 to 5%, particularly from 0.05 to 3% of a metal of group (d) such as hereinbefore defined (scandium, yttrium, titanium, zirconium, hafnium, thorium and germanium), these contents being expressed by weight with respect to the catalyst carrier.

Whenever required, the catalyst further contains from 0.1 to 10 percent and preferably from 0.2 to 5 percent by weight of halogen, for example chlorine or fluorine, with respect to the catalyst carrier.

The catalyst may be manufactured according to conventional methods consisting of impregnating the carrier by means of solutions of the metal compounds to be introduced therein. Either a common solution of these metals or separate solutions of each metal are to be used. When using several solutions, one may proceed with intermediate drying and/or roasting steps. A roasting finally occurs, for example at about 500° – 1,000°C, preferably in the presence of free oxygen, for example with air stripping.

Examples of compounds of metals of group (d) are the nitrates, chlorides, bromides, fluorides, sulfates and acetates, or again any other salt of these metals soluble in water or hydrochloric acid, for example a metal chloroplatinate.

Platinum may be used in any known manner, for example as hexachloroplatinic acid, ammonium hexachloroplatinate, platinum sulfide, sulfate or chloride.

Iridium may be employed in any known manner, for example as chloride, bromide, sulfate or sulfide or as hexachloroiridic acid, hexabromoiridic acid or hexafluoroiridic acid.

The halogen may be introduced as one of the above halides or in the form of hydrochloric acid, hydrofluoric acid, ammonium chloride, ammonium fluoride, gaseous chlorine or a hydrocarbon halide, for example $CCl_4$, $CHCl_3$ or $CH_3Cl$.

A first method of manufacture consists, for example, in impregnating the carrier by means of an aqueous solution of a nitrate or another compound of a metal of group (d), drying at about 120°C and maintaining in air for a few hours at a temperature of from 500° to 1,000°C, preferably about 700°C; a second impregnation by means of a solution containing platinum and iridium, for example a solution of hexachloroplatinic acid and hexachloroiridic acid, then occurs.

Another method consists, for example, in impregnating the carrier by means of a solution containing:

1. Platinum, for example hexachloroplatinic acid
2. Iridium, for example hexachloroiridic acid
3. The metal of group (d), for example a chloride, bromide, fluoride, sulfate or acetate or any other salt soluble in water or hydrochloric acid, for example a chloroplatinate, and
4. Optionally chlorine or fluorine.

Another method consists of introducing the metal elements by effecting a number of successive impregnation identical to the number of metal elements of the catalyst; for example by a first introduction of iridium as contained in a solution, optionally followed with drying and roasting, a subsequent introduction of platinum as contained in a solution, optionally followed with drying and roasting, and finally the introduction of the metal of group (d), followed with drying and roasting at a temperature of about 500° – 1,000°C.

Whenever required, the impregnations may be conducted in any different order.

The porous aluminae used for manufacturing the catalyst of the invention are well-known and need not to be further described.

The so-obtained catalysts may be used in many known reactions of hydrocarbon conversion in which platinum catalysts have been previously used, particularly reforming, dehydrogenation, aromatization, dehydrocyclization, isomerization and hydrocracking. These reactions are usually carried out in the temperature range of from 300° to 600°C.

The reforming reactions are usually conducted at a temperature of from about 450° to about 580°C, under a pressure of from about 5 to about 20 kg/cm² at a hourly reaction rate of from 0.5 to 10 volumes of liquid charge (naphtha boiling in the range of from about 60 to about 220°C) per volume of catalyst.

The following examples illustrate the invention but must not be considered as limiting the scope thereof in any respect:

EXAMPLE 1

The following naphtha is treated:

| | |
|---|---|
| Distillation A.S.T.M. | : 80 – 160°C |
| Composition : aromatic hydrocarbons | : 7 % by weight |
| naphthenic do. | : 27 % do. |
| paraffinic do. | : 66 % do. |
| Octane number (clear research) | : about 37 |
| Average molecular weight | : 110 |
| Density at 20°C | : 0.782 |

This naphtha is passed with recycle hydrogen over various alumina-containing catalysts A – G having a content of metal elements as reported in table 1. The catalysts A – G have a specific surface of 230 m²/g, a pore volume of 54 cc per gram and a chlorine content of 1 percent.

The catalysts have been prepared from an alumina having a specific surface of 240 m²/g and a pore volume of 59 cm³ per gram.

Catalyst A has been manufactured by adding 100 cc of an aqueous solution of:
- 3.37 g of scandium nitrate Sc $(NO_3)_3$, $H_2O$
- 2.24 g of concentrated HCl (d:1.19),
- 8 g of an aqueous solution of chloroplatinic acid with a 2.5 percent by weight content of Pt,
- 2.18 g of a chloroiridic acid solution having a 2.3 percent by weight content of Ir,
- and 5.2 cc of a 20% monoethanolamine solution (this solution has a pH of 4.2),
to 100 g of alumina.

After 5 hours of contact, the solid material is separated, dried for 1 hour at 100°C and then roasted for 4 hours at 530°C in dry air (drying with activated alumina).

It is finally reduced in a dry hydrogen stream (dried over activated alumina) for 2 hours at 450°C.

The so-obtained catalyst contains:
0.20% of platinum, 0.05% of iridium, 0.5% of scandium and 1.18% of chlorine by weight with respect to the catalyst carrier. The other catalysts B to G have been prepared according to similar methods which will not be further described.

The operation is so conducted as to obtain a clear octane number of 96.2.

The experimental conditions are the following:

| | |
|---|---|
| Pressure | 20 bars |
| Molar ratio of $H_2$ to the hydrocarbons | 5 |
| Naphtha weight/catalyst weight/hour | 3 |

The inlet temperature of the reactor is 490 ± 1°C. It is sufficient to raise it stepwise up to 530°C, for maintaining the octane number constant.

The $C_5^-$ yield and the hydrogen % in the recycled gas, when the desired octane number is obtained, are given in table I for catalysts A – G.

EXAMPLE 1 A

This example is given for comparison purposes and forms no part of this invention.

Example 1 is repeated by using a catalyst containing 0.25% of platinum (one single catalytic element) and a catalyst containing 0.20% of platinum and 0.05% of iridium. Each of these catalysts contains 1.18% of chlorine.

The $C_5^-$ yield and the percent hydrogen in the recycled gas, when the desired octane number is attained, are given in table 1 A for the two catalysts.

It may be observed that, when using a catalyst only containing platinum or even using a catalyst only containing platinum and iridium, the yields are substantially lower than those obtained in table I with catalysts A – G.

TABLE I A

| Catalyst | Yield of $C_5^+$ by weight | Molar % of $H_2$ in the recycled gas |
|---|---|---|
| 0.25 % Pt | 81.8 | 81.6 |
| 0.20 % Pt 0.05 % Ir | 81.9 | 81.8 |

EXAMPLE 2

Example 1 is repeated by using catalysts A' – G' and A'' – G'' identical to the catalysts A – G, except that each of the catalysts A' – G' contains 0.004 percent of metal of group (d) and each of the catalysts A'' – G'' contains 0.08 percent of metal of group (d). All the catalysts contain 1.18 percent of chlorine. The results obtained with catalysts A' – G' are all substantially the same as those obtained with the catalyst of table I A which contains 0.20% of platinum and 0.05% of iridium. The results obtained with catalysts A'' – G'' are given in table II. They are substantially identical to those obtained in table I.

EXAMPLE 3

Example 1 is repeated by using catalysts $A_1$– $G_1$ not containing iridium. The other characteristics of the catalysts $A_1$– $G_1$ are those of the catalysts A – G used in example 1. The content of metal elements was slightly altered so as to have the same total content of metal elements in catalysts $A_1$– $G_1$ and A – G. These catalysts contain 1.18% of chlorine.

The $C_5^-$ yield and the hydrogen % in the recycled gas when the desired octane number of 96.2 has been obtained are given in table III.

Slightly poorer results, if not equal, are obtained with catalysts $A_1$– $G_1$, as compared with catalysts A – G; but the main advantage of the catalysts of this invention is, above all, their substantially increased lifetime, as compared to the catalysts used up to now.

Thus table IV of example 3 shows that, at mid-run and by using catalysts $A_1$– $G_1$, the $C_5^-$ yield and the hydrogen % in the recycled gas are lower than when using catalysts A – G. The mid-run time depends on the catalyst: it is the greater as the catalyst is the more stable; it is roughly 560 hours for catalysts A – G and roughly only 370 hours for catalysts $A_1$–$G_1$. It may be noted that the mid-run time, when using a catalyst containing 0.2% of platinum and 0.05% of iridium, is about 400 hours.

Although catalysts $A_1$–$G_1$ and A'' – G'' cannot be strictly compared since catalysts $A_1$– $G_1$ have not the same total content of metal elements as the catalysts A'' – G'', it must be noted that, when using the catalysts A''– G'' according to this invention, which contain 0.2 % of platinum, 0.05% of iridium and relative low amounts of a metal of group (d), substantially similar results are obtained, as shown in table II, as compared to those obtained with catalysts $A_1$– $G_1$ which contain 0.25% of platinum and 0.5% of a metal of group (d) without iridium and do not conform to the invention, as shown in table III.

As hereinbefore indicated the catalysts of this invention have as main advantage a long lifetime. Thus, by comparing the results obtained at mid-run with catalysts $A_1$– $G_1$ of table IV to those obtained at mid-run with catalysts A''– G'' of table V, it appears that the $C_5^-$ yields and the hydrogen % in the recycled gas are better when using catalysts A''– G'', which demonstrates the superiority of catalysts such as A''–G'' over catalysts such as $A_1$– $G_1$. Moreover, the mid-run time of roughly 540 hours, when using the catalysts A'' – G'', is far longer than that obtained with catalysts $A_1$–$G_1$ (roughly 370 hours).

EXAMPLE 4

The production of a gasoline having a very high octane number requires quite severe conditions that the conventional catalysts hardly withstand.

The present example shows that it is quite possible to use the catalysts of this invention, even under particularly severe conditions, for producing a gasoline of very high octane number.

The feedstock of example 1 is so treated as to produce a gasoline of a 103 O.N. clear; the catalysts A to G are used under the following conditions:

| | |
|---|---|
| pressure | : 10 bars |
| temperature | : 530°C |
| Molar ratio H$_2$/hydrocarbons | : 8 |
| Naphtha weight/catalyst weight/hour | : 1.65 |

Table VI gives the $C_5^-$ yield and the hydrogen % content of the recycled gas after 200 hours. By way of comparison, the $C_5^-$ by weight is 75.1 and the molar hydrogen % 74.8, when working under the same conditions with a catalyst containing 0.2% of platinum and 0.05% of iridium.

TABLE I

| Catalyst % by weight | | | | % $C_5^+$ yield by weight | Recycled gas molar % H$_2$ |
|---|---|---|---|---|---|
| | % Pt | % Ir | % metal (d) | | |
| A | 0.2 | 0.05 | 0.5 scandium | 82.3 | 82.6 |
| B | 0.2 | 0.05 | 0.5 yttrium | 82.5 | 82.8 |

TABLE I-Continued

| Catalyst % by weight | | | | % $C_5^+$ yield by weight | Recycled gas molar % H$_2$ |
|---|---|---|---|---|---|
| C | 0.2 | 0.05 | 0.5 titanium | 82.2 | 82.3 |
| D | 0.2 | 0.05 | 0.5 zirconium | 82.4 | 82.3 |
| E | 0.2 | 0.05 | 0.5 hafnium | 82.3 | 82.2 |
| F | 0.2 | 0.05 | 0.5 thorium | 82.0 | 82.1 |
| G | 0.2 | 0.05 | 0.5 germanium | 81.8 | 82.0 |

TABLE II

| Catalyst % by weight | | | | % $C_5^+$ yield by weight | Recycled gas molar % H$_2$ |
|---|---|---|---|---|---|
| | % Pt | % Ir | % metal (d) | | |
| A'' | 0.2 | 0.05 | 0.08 scandium | 82.2 | 82.5 |
| B'' | 0.2 | 0.05 | 0.08 yttrium | 82.4 | 82.7 |
| C'' | 0.2 | 0.05 | 0.08 titanium | 82.2 | 82.2 |
| D'' | 0.2 | 0.05 | 0.08 zirconium | 82.4 | 82.2 |
| E'' | 0.2 | 0.05 | 0.08 hafnium | 82.2 | 82.2 |
| F'' | 0.2 | 0.05 | 0.08 thorium | 82.0 | 82.0 |
| G'' | 0.2 | 0.05 | 0.08 germanium | 81.6 | 81.9 |

TABLE III

| Catalyst % by weight | | | % $C_5^+$ yield by weight | Recycled gas molar % H$_2$ |
|---|---|---|---|---|
| | % Pt | % metal (d) | | |
| $A_1$ | 0.25 | 0.5 scandium | 82.2 | 82.5 |
| $B_1$ | 0.25 | 0.5 yttrium | 82.4 | 82.7 |
| $C_1$ | 0.25 | 0.5 titanium | 82.2 | 82.2 |
| $D_1$ | 0.25 | 0.5 zirconium | 82.2 | 82.2 |
| $E_1$ | 0.25 | 0.5 hafnium | 82.2 | 82.1 |
| $F_1$ | 0.25 | 0.5 thorium | 82.0 | 82.0 |
| $G_1$ | 0.25 | 0.5 germanium | 81.6 | 81.8 |

TABLE IV

| Catalyst % by weight | | | | % $C_5^+$ yield mid-run by weight | Recycled gas molar % H$_2$ mid-run |
|---|---|---|---|---|---|
| | % Pt | % Ir | % metal (d) | | |
| A | 0.2 | 0.05 | 0.5 scandium | 82.1 | 82.5 |
| $A_1$ | 0.25 | — | 0.5 scandium | 81.4 | 81.9 |
| B | 0.2 | 0.05 | 0.5 yttrium | 82.4 | 82.7 |
| $B_1$ | 0.25 | — | 0.5 yttrium | 81.8 | 82.1 |
| C | 0.2 | 0.05 | 0.5 titanium | 82 | 82.5 |
| $C_1$ | 0.25 | — | 0.5 titanium | 81.5 | 81.3 |
| D | 0.2 | 0.05 | 0.5 zirconium | 82.2 | 81.9 |
| $D_1$ | 0.25 | — | 0.5 zirconium | 81.6 | 81.3 |
| E | 0.2 | 0.05 | 0.5 hafnium | 82.1 | 82.2 |
| $E_1$ | 0.25 | — | 0.5 hafnium | 81.5 | 81.5 |
| F | 0.2 | 0.05 | 0.5 thorium | 81.9 | 82 |
| $F_1$ | 0.25 | — | 0.5 thorium | 81.5 | 81.4 |
| G | 0.2 | 0.05 | 0.5 germanium | 81.6 | 81.4 |
| $G_1$ | 0.25 | — | 0.5 germanium | 80.6 | 80.2 |

TABLE V

| Catalyst % by weight | | | % C$_5^+$ yield mid-run by weight | Recycled gas molar % H$_2$ mid-run |
|---|---|---|---|---|
| | % Pt | % Ir | % metal (d) | | |
| A'' | 0.2 | 0.05 | 0.08 scandium | 81.9 | 82.3 |
| B'' | 0.2 | 0.05 | 0.08 yttrium | 82.1 | 82.5 |
| C'' | 0.2 | 0.05 | 0.08 titanium | 81.7 | 82.0 |
| D'' | 0.2 | 0.05 | 0.08 zirconium | 82.0 | 81.6 |
| E'' | 0.2 | 0.05 | 0.08 hafnium | 81.9 | 82.0 |
| F'' | 0.2 | 0.05 | 0.08 thorium | 81.7 | 81.8 |
| G'' | 0.2 | 0.05 | 0.08 germanium | 81.3 | 81.1 |

TABLE VI

| Catalyst | % C$_5^+$ yield by weight | Recycled gas molar % H$_2$ |
|---|---|---|
| A | 79.3 | 78.5 |
| B | 79.5 | 78.9 |
| C | 79.6 | 79.3 |
| D | 78.6 | 78.3 |
| E | 79.3 | 79.3 |
| F | 78.2 | 78.0 |
| G | 77.8 | 77.7 |

What we claim is:

1. A new catalyst containing (a) an alumina carrier, (b) platinum, (c) iridium and (d) at least one metal selected from the group consisting of scandium, yttrium, titanium, zirconium, hafnium and thorium, the catalyst containing from 0.005 to 1% by weight of platinum, from 0.005 to 1% by weight of iridium and from 0.005 to 5% by weight of at least one metal of the group consisting of scandium, yttrium, titanium, zirconium, hafnium and thorium, with respect to the catalyst carrier.

2. A catalyst according to claim 1, wherein the total content of metal of the group (d) is from 0.05 to 3 percent by weight with respect to the catalyst carrier.

3. A catalyst according to claim 2, containing 0.05 to 0.8% platinum and 0.01 to 0.09% iridium.

4. A catalyst according to claim 3, further containing halogen in a proportion of from 0.1 to 10% by weight with respect to the catalyst carrier.

5. A catalyst according to claim 1, containing 0.005 to 0.8% platinum and 0.01 to 0.09% iridium.

6. A catalyst according to claim 1, further containing halogen in a proportion of from 0.1 to 10 percent by weight with respect to the catalyst carrier.

7. A catalyst according to claim 6 containing scandium.

8. A catalyst according to claim 6 containing yttrium.

9. A catalyst according to claim 6 containing titanium.

10. A catalyst according to claim 6 containing zirconium.

* * * * *